United States Patent
Goudalle et al.

(10) Patent No.: US 11,174,994 B2
(45) Date of Patent: Nov. 16, 2021

(54) OXY-ACETYLENE WORK APPARATUS AND METHOD FOR DETERMINING THE OPERATING TIME OF SAID APPARATUS

(71) Applicant: L'Air Liquide, Société Anonyme pour l'Etude et l'Exploitation des Procédés Georges Claude, Paris (FR)

(72) Inventors: Sébastien Goudalle, Sens (FR); Michele Quattrone, Jouy en Josas (FR); Henri Glen, Grandchamp (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 846 days.

(21) Appl. No.: 15/779,186

(22) PCT Filed: Nov. 22, 2016

(86) PCT No.: PCT/FR2016/053047
§ 371 (c)(1),
(2) Date: May 25, 2018

(87) PCT Pub. No.: WO2017/089696
PCT Pub. Date: Jun. 1, 2017

(65) Prior Publication Data
US 2021/0199247 A1    Jul. 1, 2021

(30) Foreign Application Priority Data
Nov. 26, 2015 (FR) ........................ 1561428

(51) Int. Cl.
*F17C 7/00* (2006.01)
*G01F 22/02* (2006.01)
(Continued)

(52) U.S. Cl.
CPC .............. *F17C 13/003* (2013.01); *F17C 7/00* (2013.01); *G01F 22/02* (2013.01); *G01F 23/18* (2013.01);
(Continued)

(58) Field of Classification Search
CPC ............ F17C 13/003; F17C 2201/0104; F17C 2201/056; F17C 2205/013;
(Continued)

(56) References Cited

U.S. PATENT DOCUMENTS 4,876,903 A    10/1989  Budinger
2002/0170347 A1*  11/2002  Stabile .................. F17C 13/026
73/149

(Continued)

FOREIGN PATENT DOCUMENTS

EP    2 700 467    2/2014
FR    2 873 644    2/2006
(Continued)

OTHER PUBLICATIONS

Written Opinion for PCT/FR2016/053047, dated Nov. 22, 2016 (Eng. Translation).
(Continued)

*Primary Examiner* — Jason K Niesz
(74) *Attorney, Agent, or Firm* — Elwood L. Haynes

(57) ABSTRACT

An oxyacetylene type work apparatus including a first container containing acetylene; a first pressure gauge configured to measure the pressure in the first container, a first two-dimensional marking disposed on the first dial, a second container containing oxygen; a second pressure gauge configured to measure the pressure in the second container, a second two-dimensional marking disposed on the second dial, an image capturing device configured to produce images of the first pressure gauge and of the second pressure
(Continued)

gauge; an electronic logic circuit configured to process said images of the first and second pressure gauges thereby determining the respective angular positions, and a sensor configured to measure the temperature of the first acetylene container.

18 Claims, 8 Drawing Sheets

(51) Int. Cl.
*F17C 13/00* (2006.01)
*G01F 23/18* (2006.01)

(52) U.S. Cl.
CPC .......... *F17C 2201/0104* (2013.01); *F17C 2201/056* (2013.01); *F17C 2205/013* (2013.01); *F17C 2205/0161* (2013.01); *F17C 2205/0165* (2013.01); *F17C 2205/0338* (2013.01); *F17C 2205/0394* (2013.01); *F17C 2205/054* (2013.01); *F17C 2221/011* (2013.01); *F17C 2221/018* (2013.01); *F17C 2223/0123* (2013.01); *F17C 2223/035* (2013.01); *F17C 2250/032* (2013.01); *F17C 2250/034* (2013.01); *F17C 2250/043* (2013.01); *F17C 2250/0439* (2013.01); *F17C 2250/0473* (2013.01); *F17C 2250/0491* (2013.01); *F17C 2250/0495* (2013.01); *F17C 2250/0673* (2013.01); *F17C 2260/024* (2013.01); *F17C 2270/0545* (2013.01)

(58) Field of Classification Search
CPC ...... F17C 2205/0161; F17C 2205/0165; F17C 2205/0338; F17C 2205/0394; F17C 2205/054; F17C 2221/011; F17C 2221/018; F17C 2223/0123; F17C 2223/035; F17C 2250/032; F17C 2250/034; F17C 2250/043; F17C 2250/0439; F17C 2250/0473; F17C 2250/0491; F17C 2250/0495; G01F 22/02; G01F 23/18
See application file for complete search history.

(56) References Cited

U.S. PATENT DOCUMENTS

| 2008/0140336 | A1 | 6/2008 | Home | |
| 2012/0188076 | A1* | 7/2012 | McSheffrey | A62C 37/50 340/539.17 |
| 2017/0003189 | A1* | 1/2017 | Bernard | G01L 19/16 |

FOREIGN PATENT DOCUMENTS

| JP | H09 166469 | 6/1997 |
| WO | WO 2005 093377 | 10/2005 |
| WO | WO 2015 136207 | 9/2015 |

OTHER PUBLICATIONS

International Search Report for corresponding PCT/FR2016/053047, dated Feb. 17, 2017.

* cited by examiner

OXY-ACETYLENE WORK APPARATUS AND METHOD FOR DETERMINING THE OPERATING TIME OF SAID APPARATUS

CROSS REFERENCE TO RELATED APPLICATIONS

This application is a 371 of International Application PCT/FR2016/0530478, filed Nov. 22, 2016, which claims priority to French Patent Application 1561428, filed Nov. 26, 2015, the entire contents of which are incorporated herein by reference.

BACKGROUND

The invention relates to an oxyacetylene type work apparatus comprising a first container containing acetylene and a second container containing oxygen, said apparatus allowing the residual amounts of acetylene and oxygen to be determined in said first and second containers respectively, and to a method for determining the autonomy of said apparatus in terms of the amount of residual gas or in terms of time.

Oxyacetylene work methods, in particular welding, cutting or brazing methods, are performed using blowpipes, the energy of which is produced by the simultaneous combustion of two gases, oxygen ($O_2$) as oxidant gas and acetylene ($C_2H_2$) as fuel gas. During use, an acetylene container and an oxygen container are connected to the oxyacetylene blowpipe, the principle of which is to cause these two gases to be mixed, which mixture, once ignited on a remote torch, allows a flame to be obtained with a temperature typically of up to 3,000° C.

Oxygen is currently conditioned in pressurized gas containers, typically gas cylinders or gas bundles, i.e. a set of a plurality of cylinders in fluid communication with each other. The gas cylinders or bundles are equipped with a valve unit, with or without an integrated pressure reducing valve, namely a single open/closed type valve with a pressure gauge or an integrated pressure reducing valve, allowing the flow and the pressure of the delivered gas to be controlled.

In order to measure the oxygen pressure in the container and to be able to determine whether or not the container still contains gas, a pressure measurement device is normally arranged on the valve unit, which device is typically a pressure gauge with a freely rotating needle.

Such a pressure measurement device displays the pressure on a dial bearing graduations corresponding to pressure values, opposite which the needle comes to rest under the effect of the gas pressure in order to indicate a measured pressure value.

A pressure gauge is also known from document WO-A-2015/136207 that allows automated reading of the measured pressure value to be implemented and thus avoids the user having to systematically observe the pressure value corresponding to the graduation indicated by the pressure gauge needle. This pressure gauge implements two-dimensional code marking allowing the angular position of the needle to be automatically detected. The residual pressure that is read is used as an indicator of the gas content of the container.

Due to its instability, a specific feature of acetylene is that of being conditioned by dissolving in a solvent, generally acetone or dimethylformamide (DMF), which is dispersed in a porous mass filling the gas container. This conditioning allows the acetylene to be safely transported and stored.

The acetylene and oxygen containers of an oxyacetylene apparatus are generally equipped with valve units provided with pressure gauges allowing an operator to know the residual gas pressures in the containers.

However, in the case of acetylene, the measured residual pressure does not reliably reflect the amount of acetylene remaining in the container.

Indeed, the solubility coefficient of acetylene in acetone significantly varies as a function of the temperature. Thus, as can be seen in FIG. 1, which shows the pressure variation in acetylene cylinders as a function of the ambient temperature, the pressure gauge of a container containing a determined amount of acetylene will display a pressure value that typically varies from single to double figures if the ambient temperature varies from approximately 5° C. to 30° C. It is to be noted that the more the temperature decreases, the more the solubility coefficient of the acetylene in the acetone increases.

Furthermore, the transition of the dissolved acetylene to the free gaseous phase is an endothermal reaction. This means that an acetylene cylinder cools as it is used. This phenomenon is shown in FIG. 2, which shows the evolution over time of the temperatures measured on different zones of the outer surface of a cylinder distributing a constant flow of acetylene. It is to be noted that the drop in temperature depends on the flow of acetylene distributed by the cylinder. In the event of prolonged use, the distribution of acetylene even can be stopped due to the cooling effect of the cylinder. This phenomenon corresponds to the fact that at low temperature acetylene remains dissolved in the solvent. The acetylene can only be released if the temperature of the cylinder increases and the acetylene is in gaseous form.

In light of the aforementioned phenomena, it is therefore understood that the user of an oxyacetylene work apparatus is not able to reliably assess the residual amount of acetylene on the basis of the pressure measured by the pressure gauge. It is then difficult to know whether a sufficient amount of acetylene is available to perform a given task or to anticipate the possible replacement of the acetylene container.

Document WO-A-2005/093377 discloses a processing system for measuring the autonomy of a container in terms of time or of remaining amount of compressed gas. However, this solution does not relate to a dissolved gas and is still based on pressure measurements and, consequently, does not overcome the particular problem of determining the content of an acetylene container.

One technical problem that is raised is that of overcoming all or part of the aforementioned disadvantages, in particular of providing a work apparatus of the oxyacetylene type that allows the residual amounts of acetylene and oxygen within said apparatus to be determined in a reliable and reproducible manner, that is also simple to implement, and in particular is easily adaptable on pressure measurement systems with a movable indicator, as well as of providing a method for determining the autonomy of said apparatus in terms of the residual amount of gas or of time.

SUMMARY

The solution of the invention therefore is a work apparatus of the oxyacetylene type comprising:
  a first container containing acetylene;
  a first pressure gauge for measuring the pressure in the first container, said first pressure gauge comprising a first dial and a first pressure indicator that is rotatable relative to said first dial;
  a first two-dimensional marking disposed on the first dial, said first pressure indicator being capable of adopting a plurality of angular positions relative to said first marking according to the value of the pressure in the first container;

a second container containing oxygen;

a second pressure gauge for measuring the pressure in the second container, said second pressure gauge comprising a second dial and a second pressure indicator that is rotatable relative to said first dial;

a second two-dimensional marking disposed on the second dial, said second pressure indicator being capable of adopting a plurality of angular positions relative to said second marking according to the value of the pressure in the second container;

an image capturing device configured to produce images of the first pressure gauge and of the second pressure gauge;

an electronic logic circuit configured to process said images of the first and second pressure gauges so as to determine the respective angular positions of the first and second pressure indicators relative to the first and second two-dimensional markings and to deduce from said angular positions the pressure values measured by the first and second pressure gauges, respectively, characterized in that:

the apparatus further comprises a sensor for measuring the temperature of the first acetylene container, the electronic logic circuit being configured to:

determine the residual amount of acetylene in the first container (1), in accordance with a predetermined initial amount of acetylene in the first container (1), the value of the temperature of the first container (1) measured by the sensor (6) and the value of the pressure measured by the first pressure gauge (2); and determine the residual amount of oxygen in the second container (21), in accordance with a predetermined initial amount of oxygen in the second container (21) and the value of the pressure measured by the second pressure gauge (22).

As appropriate, the apparatus of the invention can comprise one or more of the following technical features:

the temperature sensor is configured to measure the temperature of the outer surface of the first container;

the temperature sensor is configured to measure the temperature through contact with the first container;

the temperature sensor is affixed on the outer surface of the first container, preferably the temperature sensor is located in an adhesive strip;

the temperature sensor is configured to remotely transmit, preferably via radio waves, temperature values of the first container;

the temperature sensor is of the liquid crystal thermometer type;

the temperature sensor is of the infrared thermometer type;

said predetermined initial amount of acetylene is encoded in the first two-dimensional marking, the electronic logic circuit being configured to process the image of the first pressure gauge so as to decode said predetermined initial amount of acetylene;

said predetermined initial amount of oxygen is encoded in the second two-dimensional marking, the electronic logic circuit being configured to process the image of the second pressure gauge so as to decode said predetermined initial amount of oxygen;

said predetermined initial amount of acetylene and/or said predetermined initial amount of oxygen are stored in the electronic logic circuit;

the apparatus comprises a blowpipe comprising a first supply line in fluid communication with the first container containing acetylene, a second supply line in fluid communication with the second container containing oxygen and a nozzle in fluid communication with said first and second passages, said nozzle being configured so as to distribute a predetermined flow of an oxygen-acetylene mixture when the blowpipe is supplied, via the first supply line, with a first determined acetylene pressure and when the blowpipe is supplied, via the second supply line, with a second determined oxygen pressure;

the electronic logic circuit is configured to determine a first duration of acetylene autonomy, in accordance with the predetermined flow of oxygen-acetylene mixture, said first acetylene pressure and the residual amount of acetylene in the first container, and to determine a second duration of oxygen autonomy, in accordance with the predetermined flow of oxygen-acetylene mixture, said second oxygen pressure and the residual amount of oxygen in the second container;

the electronic logic circuit is configured to compare the first duration of acetylene autonomy and the second duration of oxygen autonomy and to determine the shortest of said first and second durations as being the autonomy of the apparatus in terms of time.

Furthermore, the invention also relates to a work method of the oxyacetylene type, in particular cutting, welding, brazing or braze-welding, characterized in that it is implemented by means of an apparatus according to the invention.

According to another aspect, the invention further relates to a method for determining the autonomy of an apparatus according to the invention, said method comprising the following steps:

a) producing an image of the first pressure gauge and processing said image so as to determine the angular position of the first pressure indicator relative to the first two-dimensional marking;

b) deducing from the angular position of the first pressure indicator the value of the pressure measured by the first pressure gauge;

c) producing an image of the second pressure gauge and processing said image so as to determine the angular position of the second pressure indicator relative to the second two-dimensional marking;

d) deducing from the angular position of the second pressure indicator the value of the pressure measured by the second pressure gauge;

e) measuring the temperature of the first container;

f) determining a predetermined initial amount of acetylene;

g) determining a predetermined initial amount of oxygen;

h) processing the data obtained in steps b), e) and f) so as to determine the residual amount of acetylene in the first container; and i) processing the data obtained in steps d) and g) so as to determine the residual amount of oxygen in the second container.

Preferably, during step b), the image of the first pressure gauge (2) is processed so as to decode a predetermined initial amount of acetylene encoded in the first two-dimensional marking (5) and/or, during step g), the image of the second pressure gauge (22) is processed so as to decode a predetermined initial amount of oxygen encoded in the second two-dimensional marking (25).

Said method can further comprise a step of storing the following data inside the electronic logic circuit:

a flow rate of the oxygen-acetylene mixture distributed by the nozzle of a blowpipe;

a value of the first blowpipe acetylene supply pressure; and a value of the second blowpipe oxygen supply pressure, the electronic logic circuit being configured to determine a first duration of acetylene autonomy, in accordance with the predetermined flow rates of the oxygen-acetylene mixture, the first acetylene pressure and the residual amount of acetylene in the first container, and to determine a second duration of oxygen autonomy, in accordance with the predetermined flow of oxygen-acetylene mixture, said second oxygen pressure and the residual amount of oxygen in the second container.

Advantageously, it further comprises the following steps:

comparing the first acetylene autonomy duration and the second oxygen autonomy duration; and determining the shortest of said first and second durations as being the autonomy of the apparatus in terms of time.

Preferably, the limit gas is determined as being the acetylene if the first duration of acetylene autonomy is less than the second duration of oxygen autonomy or the oxygen if the first duration of acetylene autonomy is greater than the second duration of oxygen autonomy.

BRIEF DESCRIPTION OF THE DRAWINGS

The invention will now be better understood by virtue of the following detailed description, which is provided by way of a non-limiting illustration, with reference to the accompanying drawings, in which.

DESCRIPTION OF PREFERRED EMBODIMENTS

Figure 1:
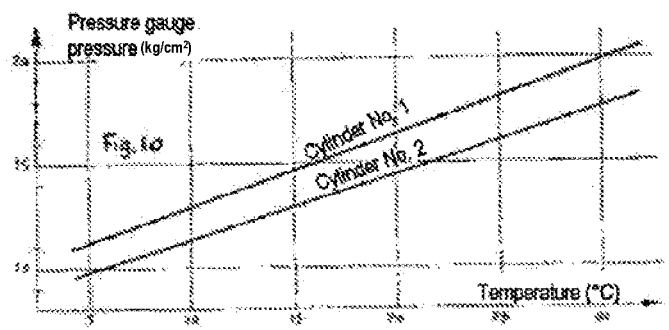
FIG. 1 shows the solubility coefficient of acetylene in acetone significantly varies as a function of the temperature.
Figure 2:
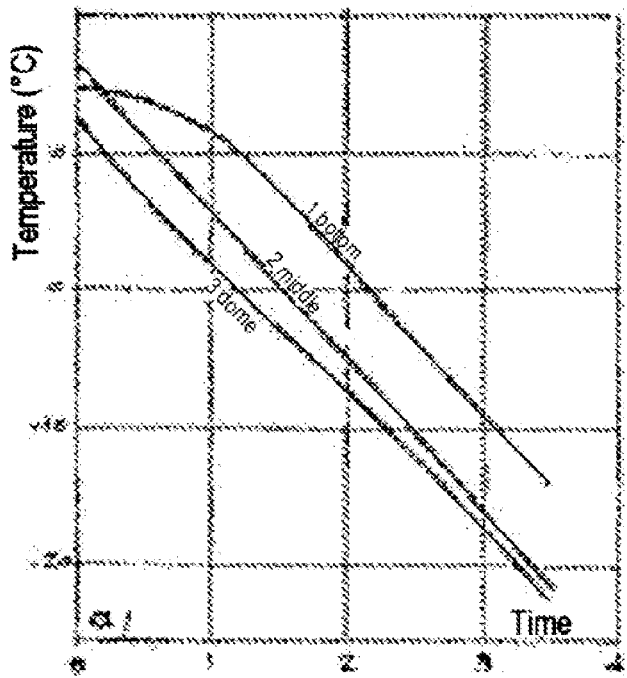
FIG. 2 shows the transition of the dissolved acetylene to the free gaseous phase is an endothermal reaction.
Figure 3:
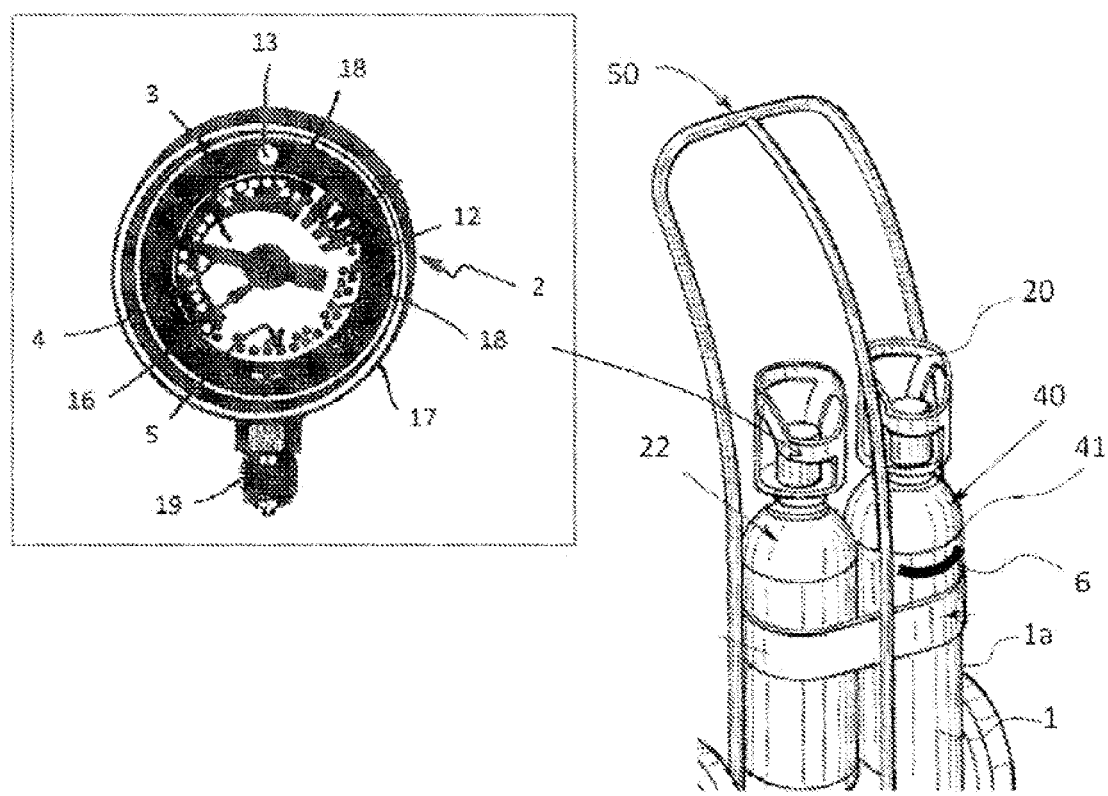
FIG. 3 shows a partial schematic view of an embodiment of an apparatus according to the invention.

FIG. 3 shows a pressure gauge 2 for measuring the pressure in a first container 1 storing acetylene.

A "container" is understood to be a gas cylinder or even a gas bundle, i.e. a set of a plurality of cylinders in fluid communication with a fluid distribution outlet.

A "pressure gauge" is understood to be a device capable of and designed for indicating the prevailing pressure in a pressurized fluid container. The pressure gauge can be of the type comprising graduations with indications of pressure values or even can be of the pressure gauge type, i.e. comprising one or more symbols representing the pressure.

Within the scope of the present invention, the containers are fluid containers under pressure, i.e. pressurized containers.

FIG. 3 shows a first container 1 containing pressurized acetylene, in particular acetylene at a pressure of up to 40 bar, forming part of an oxyacetylene welding apparatus, in combination with a second container 22 containing pressurized oxygen, in particular oxygen at a pressure of up to 300 bar. In a manner per se known, for example, from document FR-A-2873644, the first and second containers 1, 22 can be arranged on a cylinder trolley 50. Such an apparatus advantageously comprises a blowpipe (not shown) having a first supply pipe in fluid communication with the first acetylene container 1 and a second supply pipe in fluid communication with the second container 21.

The blowpipe is fitted with an interchangeable nozzle in fluid communication with said first and second passages. Depending on the work to be undertaken, the user determines the suitable nozzle, i.e. the nozzle suitable for distributing a predetermined flow of oxygen-acetylene mixture when the blowpipe is supplied with a first determined acetylene pressure and a second determined oxygen pressure.

The description of a first pressure gauge according to the invention is provided with reference to the first container 1 but it is also applicable to the second container 21, which is fitted with a second pressure gauge 22 similar to that of the pressure gauge 2, i.e. of the type with a movable indicator and two-dimensional marking.

Typically, the first pressure gauge 2 is fixed, in particular fixed by screwing via a threaded end fitting 19 borne by the housing 17, on a valve unit, with or without an integrated pressure reducing valve, advantageously protected by a cap 20, itself mounted on the first container 1 so as to measure the pressure of the fluid coming from said container 1 and passing through the valve unit.

Figure 4:
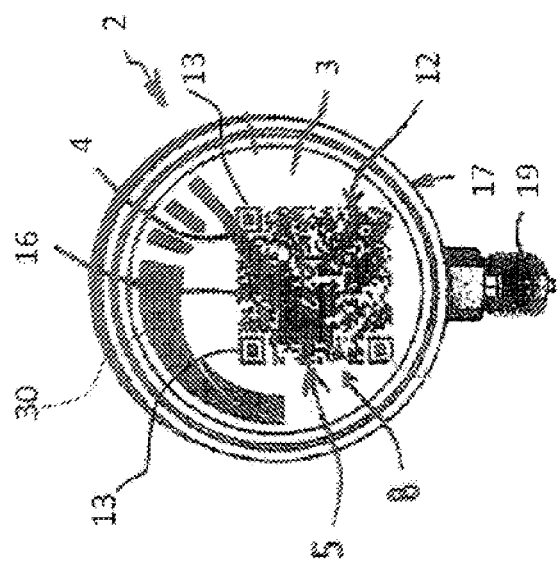
FIG. 4 shows a second embodiment of the first pressure gauge of an apparatus according to the invention.

Such a first pressure gauge 2 is formed by a housing 17 containing a pressure-sensitive flexible internal mechanism (not shown), for example a Bourdon tube or a diaphragm, cooperating with a first freely rotating pressure indicator 4, namely in general a needle 4 freely rotating about an axis 16 of rotation commonly located at the center of a first disk-shaped dial 3, i.e. having a circular periphery, bearing graduations corresponding to pressure values, or even one or more schematic indications of the gauge type, such as symbols 30, as shown in FIG. 4. The pressure is picked up from the end 19. The needle is preferably slender, advantageously its color, in particular black, contrasts with the dial 3.

Advantageously, the gas pressure measured by the first pressure gauge 2 conventionally can be read by the user on the first dial 3, given that the rotary needle 4 comes to rest, under the effect of the pressure of the acetylene, opposite the graduation corresponding to the pressure value. The first dial 3 and the needle 4 are protected by a transparent protection 18, such as a window, that is fixed to the housing 17 and covers them.

According to the invention, a first two-dimensional marking 5 is disposed on the first dial 3, with the first pressure indicator 4 being capable of adopting a plurality of angular positions relative to the first marking 5 according to the value of the pressure in the first container 1.

The term "disposed on" is understood to mean that the first marking 5 is either affixed directly on the first dial 3 or is arranged facing the first dial 3, typically on the window 18, so that it is also possible to view the superimposed images of the needle 4 and of the first marking 5. Preferably, the first marking 5 is affixed on the first dial 3, which makes determining the angular position of the needle 4 relative to the first marking 5 less sensitive to the image capture angle of the first pressure gauge 2. The first two-dimensional marking 5 can be printed, adhered, screen printed or deposited by any other technique.

The system according to the invention further comprises an image capturing device 7 (not shown in FIG. 3) configured to produce an image of the first pressure gauge 2, said image comprising at least the first two-dimensional marking 5 and the first indicator 4.

An electronic logic circuit 8 (not shown in FIG. 3) is configured to process said image of the first pressure gauge 2 so as to determine the angular position of the first pressure indicator 4 relative to the first two-dimensional marking 5 and to derive from said angular position the value of the pressure measured by the first pressure gauge 2. The electronic logic circuit 8 preferably comprises processing means, such as a microprocessor, and/or software stored inside said electronic logic circuit 8.

The present invention differs in that the system further comprises a sensor 6 for measuring the temperature of the first container 1.

According to the invention, the electronic logic circuit 8 is configured to determine the residual amount of acetylene in the container 1, in accordance with a predetermined initial amount of acetylene contained in the first container 1, the value of the temperature of the container 1 measured by the sensor 6 and the value of the pressure measured by the first pressure gauge 2.

According to a preferred embodiment of the invention, said predetermined initial amount of acetylene is encoded in the first two-dimensional marking 5. The electronic logic circuit 8 is configured to process the image of the first pressure gauge 2 so as to decode said predetermined initial amount of acetylene.

Alternatively, said predetermined initial amount of acetylene can be stored in the electronic logic circuit 8. As appropriate, said predetermined initial amount of acetylene can be previously stored in the electronic logic circuit 8 or can be transmitted to the electronic logic circuit 8 during use. For example, said amount can be entered by the user or even can be obtained after polling an external database, for example, via the Internet, and transmitting a value from said database to the electronic logic circuit 8. Within the scope of the invention, the predetermined initial amount of acetylene, denoted Q100-1, corresponds to the total amount of acetylene contained in the first container 1 in a fill state called "full", typically expressed in liters (L) of acetylene. In other words, the initial amount Q100-1 corresponds to the full commercial load, or full load, of acetylene of the first container 1. The initial amount Q100-1 depends on the water volume of the first container 1 on which the pressure gauge 2 is fixed. By way of an example, the equivalences between the initial amount Q100-1 and the water volume of the first container 1 are as follows:

Q100-1=400 L for a 3.35 L water volume;
Q100-1=800 L for a 5.8 L water volume;
Q100-1=1,400 L for a 9.6 L water volume;
Q100-1=3,000 L for a 22 L water volume;
Q100-1=6,000 L for a 41.5 L water volume;
Q100-1=7,000 L for a 50 L water volume.

Therefore, a plurality of values of the predetermined initial amount of acetylene can be stored inside the electronic logic circuit 8, advantageously in the form of tables of equivalence with different values of water volumes of the first container 1.

The electronic logic circuit can be configured so that the user can select, from these values, the water volume of the first used container 1.

As previously explained, the solubility coefficient of acetylene in acetone, and thus the acetylene pressure, varies with the temperature of the first container 1.

Indeed, as a function of the known features of the first container 1, in particular the nature of the porous mass present in the container 1, the nature of the solvent, it is possible for a relation to be established between the pressure of the first container 1 in the full state (P100-1, typically expressed in bar) and the temperature of the first container 1. Such a relation can be established by modelling or empirically, by performing pressure measurements at different temperatures of the first considered container 1.

For example, for a first determined acetylene container 1, the following computation rule is established:

$$P100\text{-}1=(0.33 \times T)+10,$$

where T is the surface temperature of the container 1 expressed in degrees Celsius (° C.).

Thus, for a first container 1 at T=20° C., then P100-1=16.6 bar.

During use, the electronic logic circuit 8 of the system according to the invention determines the value of the residual acetylene pressure measured by the first pressure gauge 2, denoted P1, typically expressed in bar.

By using the example of an initial amount of acetylene Q100-1=800 L decoded from the first marking 5 by the electronic logic circuit 8 and a pressure P1=12 bar measured at 20° C. by the first pressure gauge 2, the electronic logic circuit determines a first correction factor:

$$F1=P1/P100\text{-}1=12/16.6=0.723.$$

This factor F1 is applied to the initial amount Q100-1 in order to deduce therefrom the residual amount of acetylene Q1 in the first container 1:

$$Q1=F1 \times Q100\text{-}1=578.4\text{ L}.$$

An advantage of the system according to the invention particularly lies in the presence of the temperature sensor 6, which allows the temperature of the container 1 to be taken into account for determining the amount of acetylene effectively remaining in the container 1 in a reliable and reproducible manner. Thus, this overcomes the fact that the pressure measured by the pressure gauge 2 varies with the temperature of the container and that additionally this temperature depends on the operating conditions of the container 1. The system of the invention therefore provides the user with a reliable and direct indication of the autonomy of the container 1 in terms of amount, which allows them to assess whether the residual amount is sufficient for their intended application and to possibly anticipate the replacement of the container 1. The system according to the invention is also simple to implement and is easily adaptable to the conventional containers 1 provided with pressure gauges with a movable indicator.

According to the invention, the image capturing device 7 is also configured to produce an image of the second pressure gauge 22 equipping the second oxygen container 2. This image preferably comprises at least the second two-dimensional marking 25 and the second pressure indicator 24.

The electronic logic circuit 8 is configured to process the image of the second pressure gauge 22 so as to determine the angular position of the second pressure indicator 24 relative to the second two-dimensional marking 25 and to deduce therefrom the value of the pressure measured by the second pressure gauge 22.

According to the invention, the electronic logic circuit 8 is configured to determine the residual amount of oxygen contained in the second container 21, in accordance with a predetermined initial amount of oxygen and the value of the pressure measured by the second pressure gauge 22.

According to an advantageous embodiment of the invention, the second two-dimensional marking 25 encodes said predetermined initial amount of oxygen in the second container 21, the electronic logic circuit 8 being configured to process the image of the second pressure gauge 22 so as to decode the predetermined initial amount of oxygen encoded in the second two-dimensional marking 25.

Alternatively, said predetermined initial amount of oxygen can be stored in the electronic logic circuit 8. As appropriate, it can be previously stored in the electronic logic circuit 8 or even can be transmitted to the electronic logic circuit 8 during use. For example, it can be entered into the electronic logic circuit 8 by the user or even can be obtained from an external database, for example, via the Internet.

As already explained, oxygen is conventionally stored in the second container 21 in the form of a compressed gas. The amount of stored gas therefore does not vary or practically does not vary with the temperature, while it is possible to deduce the residual amount of oxygen from the residual fluid pressure measured in the second container 21, denoted P2.

Using the example of an initial amount of oxygen of Q100-2=1,000 L, a pressure of the second container 21 in the full state of P100-2=200 bar and a pressure measured by the second pressure gauge 22 of P2=150 bar, the electronic logic circuit 8 determines a second correction factor:

$F2=P2/P100\text{-}2=150/200=0.75.$

This factor F2 is applied to the initial amount Q100-2 in order to deduce therefrom the residual amount of oxygen Q2 in the second container 21:

$Q2=F2 \times Q100\text{-}2=750 \text{ L}.$

Advantageously, the electronic logic circuit 8 comprises storage means capable of storing computation instructions, for example, in accordance with computation rules like those described above, and computation means, also called electronic processing, such as a microprocessor, capable of processing the measured data in accordance with said computation instructions, so as to determine the residual amounts of acetylene and oxygen. Preferably, the electronic logic circuit 8 contains software comprising one or more computer programs capable of transmitting computation instructions to said computation means.

The aforementioned features allow the autonomy of the apparatus according to the invention to be determined in terms of the amount of gas.

Furthermore, it can be advantageous to know the autonomy of the apparatus in terms of time, i.e. the time during which a sufficient amount of acetylene and oxygen remains to be distributed to complete the desired work operation.

To this end, the electronic logic circuit 8 is configured to determine a first duration of acetylene autonomy, in accordance with the predetermined flow of oxygen-acetylene mixture, said first acetylene pressure and the residual amount of acetylene in the first container 1, and to determine a second duration of oxygen autonomy, in accordance with the predetermined flow of oxygen-acetylene mixture, said second oxygen pressure and the residual amount of oxygen in the second container 2.

According to a preferred embodiment of the invention, the electronic logic circuit 8 can be configured to operate the computations described in the following example.

Considering the above example, the residual amount of acetylene in the first container 1 is Q1=578.4 L and the residual amount of oxygen in the second container 21 is Q2=750 L. If the user intends to implement a welding method with a blowpipe that is provided, in a manner known per se, with a nozzle configured to distribute a flow D=1,000 L/h of oxygen-acetylene mixture, the parameters defined to obtain such a flow are a first blowpipe acetylene supply pressure of 1.5 bar and a second blowpipe oxygen supply pressure of 4 bar. These pressures actually correspond to the partial pressures of acetylene and oxygen in the oxygen-acetylene mixture, giving a total pressure of 1.5+4=5.5 bar.

A partial flow of acetylene in the mixture then can be computed as being equal to:

$(1.5 \times 1{,}000)/5.5 = \text{approximately } 273 \text{ L/h},$ and, in the same way, a partial flow of oxygen in the mixture can be computed as being equal to approximately 727 L/h.

These flows result in a first acetylene autonomy duration equal to:

$Q1/273=578.4/273=2.12 \text{ h}=\text{approximately 2 hours and 7 minutes,}$ and in a second oxygen autonomy duration equal to:

$Q2/727=750/727=1.03 \text{ h}=\text{approximately 1 hour and 2 minutes.}$

The following table shows various values of partial flows computed for a plurality of blowpipe nozzles configured to distribute predetermined flows of oxygen-acetylene mixture for determined blowpipe acetylene and oxygen supply pressures.

Preferably, the electronic logic circuit 8 is also configured to compare the first acetylene autonomy duration and the second oxygen autonomy duration. The shortest duration of said first and second durations is determined as the autonomy of the oxyacetylene apparatus in terms of time. In the above example, the user is shown that the autonomy in terms of time therefore is 1 hour and 2 minutes.

Determining which gas limits the operation of the apparatus and notifying the user accordingly also can be advantageous. In the above example, it is the second oxygen container that has the shortest autonomy duration. Therefore, the oxygen is the gas that limits the apparatus.

TABLE

| Flow of oxygen-acetylene mixture (L/h) | Blowpipe acetylene supply pressure (bar) | Blowpipe oxygen supply pressure (bar) | Partial flow of acetylene (L/h) | Partial flow of oxygen (L/h) |
|---|---|---|---|---|
| 3,000 | 1.8 | 5 | 780 | 2,220 |
| 1,000 | 1.5 | 4 | 273 | 727 |
| 400 | 1.3 | 2.6 | 132 | 268 |
| 315 | 1.1 | 2.3 | 100.8 | 214.2 |
| 250 | 1.0 | 2 | 82.5 | 167.5 |
| 160 | 0.8 | 1.6 | 52.8 | 107.2 |
| 100 | 0.7 | 1.4 | 33 | 77 |
| 63 | 0.6 | 1.2 | 20.8 | 42.2 |
| 40 | 0.3 | 0.6 | 13.2 | 26.8 |

Within the scope of the invention, the value of the flow of oxygen-acetylene mixture can be entered into the electronic logic circuit 8 by the user, for example. Alternatively, the electronic logic circuit 8 can be configured to store a plurality of standard flow rates, the user being able to select the flow that they wish to implement in their method from these values.

Preferably, said predetermined flow of oxygen-acetylene mixture is included in a range of between 30 and 3,500 L/h. The acetylene pressure in the first fluid passage is included in a range of between 0.2 and 2 bar and the oxygen pressure in the second fluid passage is included in a range of between 0.5 and 6 bar. Indeed, the flows are related to the size of the containers. Typically, 3,000 L/h is achieved for 50 L containers and 40 L/h is achieved for 3.35 L containers.

Preferably, the system according to the invention comprises at least one display 9 capable of and designed for displaying at least one item of information selected from: the value of the pressure P measured by the pressure gauge 2, the value of the temperature T of the container 1, the residual amount of acetylene Q1 in the first container 1, the residual amount of oxygen Q1 in the second container 21, the autonomy of the apparatus in terms of time, an indication of the limit gas.

Furthermore, the system according to the invention can comprise at least one human/machine interface 10, preferably an interface of the touchscreen type, configured to allow the user to enter and/or store at least one item of data inside the electronic logic circuit 8 selected from: the value of the temperature T of the container 1 measured by the sensor 6, a predetermined value D of the flow of oxygen-acetylene mixture.

Figure 5:
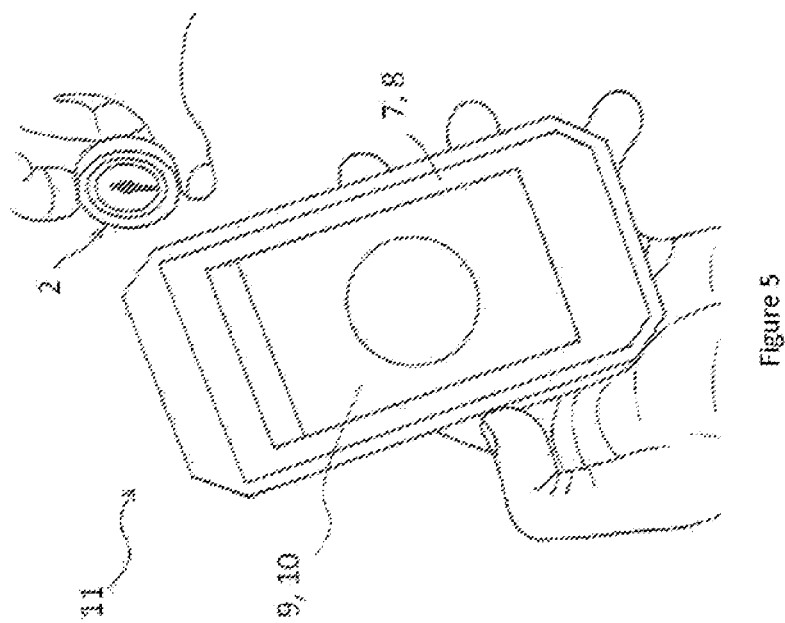
FIG. 5 shows the acquisition of the image of the first pressure gauge of FIG. 3 or 4 by means of a smartphone.

FIG. 5 shows an advantageous embodiment of the invention, in which the image capturing device 7, typically a camera, the electronic logic circuit 8, the display 9 and the touch interface 10 are located inside a reading terminal 11 of the smartphone type. Other types of suitable reading terminals 11 can be used, for example, a digital or analog tablet.

Figure 6A:
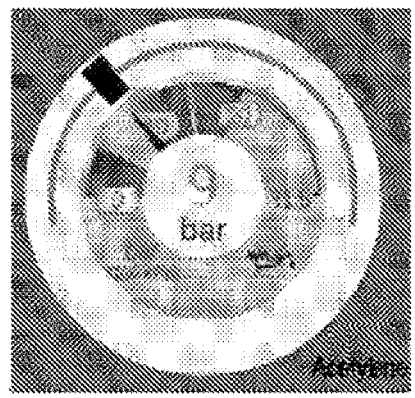
FIG. 6A shows the display of the measured pressure and of the residual amount of acetylene and oxygen on the display screen of a smartphone.
Figure 6B:
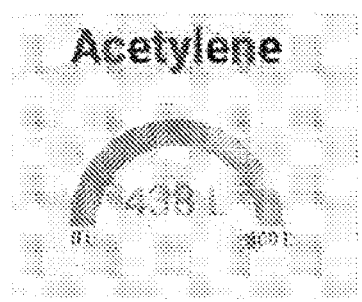
FIG. 6B shows the display of the measured pressure and of the residual amount of acetylene and oxygen on the display screen of a smartphone.
Figure 6C:
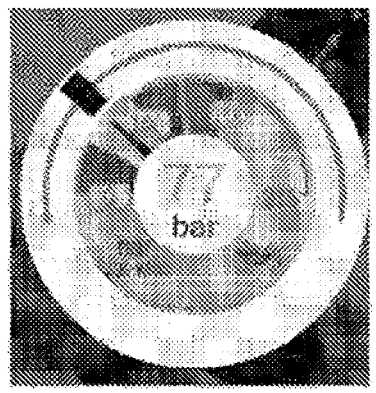
FIG. 6C shows the display of the measured pressure and of the residual amount of acetylene and oxygen on the display screen of a smartphone.
Figure 6D:
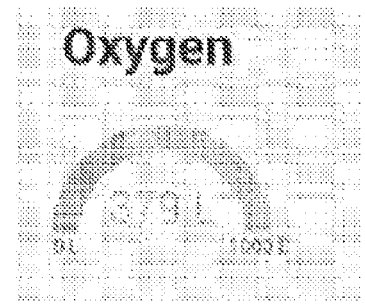
FIG. 6D shows the display of the measured pressure and of the residual amount of acetylene and oxygen on the display screen of a smartphone.

By way of examples, FIGS. 6A to 6D show information displayed by a display 9 of the telephone screen type. The user thus has direct access to the information that is decoded and computed by means of the apparatus according to the invention, such as the value of the residual pressure P1 in the container 1 obtained by processing the image of the first pressure gauge 2 (FIG. 6A), the residual amount of acetylene Q1 in the first container 1 (FIG. 6B), the residual pressure P2 in the second container 21 obtained by processing the image of the second pressure gauge 2 (FIG. 6C), the residual amount of oxygen Q2 in the second container 21 (FIG. 6D). This information can be displayed in combination with other graphic elements, for example, a graphic element of the gauge or level type showing the user the fill state of the containers 1, 21.

Within the scope of the invention, the temperature sensor 6 advantageously is configured to measure the temperature of the outer surface 1a of the container 1. Indeed, given the highly flammable nature of acetylene, arranging sensors with physical quantities inside the container should be avoided.

Preferably, the temperature sensor 6 is configured to measure temperature through contact with the container 1. For example, the sensor 6 can be of the resistance thermometer type. Detecting temperature through contact allows more reproducible temperature measurements to be provided. It is to be noted that the temperature measurements are more precise the closer the sensor is to the valve of the cylinder, with this valve being protected by the cap 20 in FIG. 3. In particular, arranging the sensor 6 between the valve and the dome 40 of the cylinder allows precise temperature measurements to be taken due to the absence of porous mass in this area of the cylinder.

According to a preferred embodiment of the invention, the temperature sensor 6 is of the liquid crystal thermometer type. Typically, this type of thermometer comprises a sensitive part formed by liquid crystals, the color of which varies according to the temperature. It offers advantages of being compact, light and inexpensive. This type of thermometer also has the advantage of operating without batteries and of not requiring an electrical power supply, with the existence of a difference in electric potential in the vicinity of the cylinder being prohibited for safety reasons. Another advantage lies in the sufficiently fast response time of these thermometers, of the order of a few seconds.

Preferably, the temperature sensor 6 is affixed on the outer surface 1a of the container 1. Such positioning allows reliable and reproducible temperature measurements to be produced and allows consideration of variations in the temperature of the cylinder during its use. Advantageously, the sensor 6 is arranged on the flat surface of the body of the cylinder, as close as possible to the dome 40, preferably at the radius 41 delimiting the body and the dome. Another advantage is that the sensor 6 is located at the eye level of the user, which facilitates reading.

Preferably, the temperature sensor 6 is in the form of an adhesive strip, as shown in FIG. 3, protected by flexible plastic. The strip has a series of graduations, each corresponding to different temperature values. The measured temperature is displayed by changing the color of a zone located in the vicinity of a determined graduation. The strip preferably extends in a direction transverse to the axis of the cylinder, as shown in FIG. 3.

Alternatively, the temperature sensor 6 can be of the infrared thermometer type. This type of thermometer remotely measures the temperature of the container 1 by measuring its radiation in the infrared band.

According to another variant, the temperature sensor is arranged on the container 1 and is configured to provide a wireless transmission, preferably via radio waves, of the measured temperature value to the electronic logic circuit 8. The electronic logic circuit 8 then comprises a data reception element configured to receive and process the temperature value of the container 1. Advantageously, the sensor 6 implements the "Bluetooth" communication standard for transmitting the measured temperature values. The electronic logic circuit 8 is preferably arranged inside a digital reading device 11, such as a smartphone or a digital tablet, which have radio wave reception elements, in particular reception elements operating using the Bluetooth data communication standard. The use of a wireless transmission sensor is advantageous since, instead of needing to be visually read by the user, it allows the reading of the temperature required to determine the amount of acetylene to be automated.

FIGS. 3 and 4 show two embodiments of a first or second pressure gauge with two-dimensional marking according to the invention. These pressure gauges, as well as their two-dimensional marking, generally have the same architecture and operate in the same way. The following features are described with reference to the first marking but are also applicable to the second marking.

The first two-dimensional marking 5 is capable of encoding, i.e. containing, one or more items of information, preferably data specific to the container 1. Preferably, the first two-dimensional marking 5 comprises a coding pattern comprising coding elements 12 containing one or more items of data.

Advantageously, the first two-dimensional marking 5 comprises geometric shapes 12, preferably a set of cones distributed over at least one part of the periphery of the first dial 3, preferably a first circular dial 3, as shown in FIG. 3. The arrangement and the number of this plurality of shapes 12 encode one or more items of data. For example, the data can be coded in the form of disks, centered or off-centered one relative to the other.

Furthermore, the first two-dimensional marking 5 can comprise at least one reference element 13, namely, in this case, one or more graphic elements, acting as a reference position allowing the first pressure indicator 4 to be positioned in the space.

In the embodiment of FIG. 3, the geometric shapes 12 of the first two-dimensional marking 5 are black and white, and possibly grey, disks distributed over the periphery of the dial 3. Typically, the first two-dimensional marking 5 in this case is of the "bleam" code type. This type of code has the advantage of being able to be read, i.e. detected, and decoded even under disrupted conditions, for example, when the image is produced subject to over or under exposure of light, when the image is captured remotely or sideways, in the presence of a focusing fault or a lack of stability, under partial occulting conditions, etc.

The presence of a single reference element 13 is also noted, in this case located at the top of the dial 3, acting as a reference position allowing the pressure indicator 4, i.e. the rotary needle, to be positioned on the dial and to thus determine an angular position of the first pressure indicator 4 relative to this reference element 13 so as to deduce a gas pressure therefrom. The presence of such a reference element 13 is particularly important for automating the reading of a pressure value displayed on the first dial 3.

This reference element 13 is or comprises a geometric shape, for example, a point, a line, a square or other shape. In this case, it is a disk-shaped point. As can be seen, in this embodiment the reference element 13 is distinct from the geometric shapes 12 encoding the residual amount Q100-1.

In the embodiment of FIG. 4, the geometric shapes 12 forming the two-dimensional marking 5 are small black squares that are distributed over a square base, the color of which contrasts with the colors of the dial base, typically a white or black square. Typically, the two-dimensional code 9 in this case is of the QR code type.

As can be seen, in this embodiment of FIG. 4, the first dial 3 bears a plurality of reference elements 13, namely graphic elements, incorporated in the geometric shapes 12 forming the first two-dimensional marking 5, i.e. it forms part of the geometric shapes 12 forming the first two-dimensional marking 5.

More specifically, the geometric shapes 12 define or plot a general square shape forming the first two-dimensional marking 5 of the QR code type and three graphic reference elements 13 are approximately positioned in three of the angles of the general square shape forming the two-dimensional marking 5.

In order to automatically identify the position of the needle 4 on the dial 3, one or more of these reference elements 13 can be used, which elements each can act as a reference position for positioning the needle 4 in the space. The reference elements 13 shown in FIG. 4 are square.

Advantageously, the first two-dimensional marking 5 can encode other determined items of information corresponding, for example, to a cylinder reference, a username, an acetylene grade, a link to a website, a supplier name or source, an expiry date, a date for re-testing the cylinder 1, a contact telephone number in the event of a problem or for any other useful information.

Thus, by virtue of the system of the invention, it is now possible to implement a measurement of the pressure displayed by the pressure gauges 2, 22 and, in an automated manner, a measurement of the autonomy in terms of the amount of gas or in terms of time according to the method described hereafter.

Figure 7:
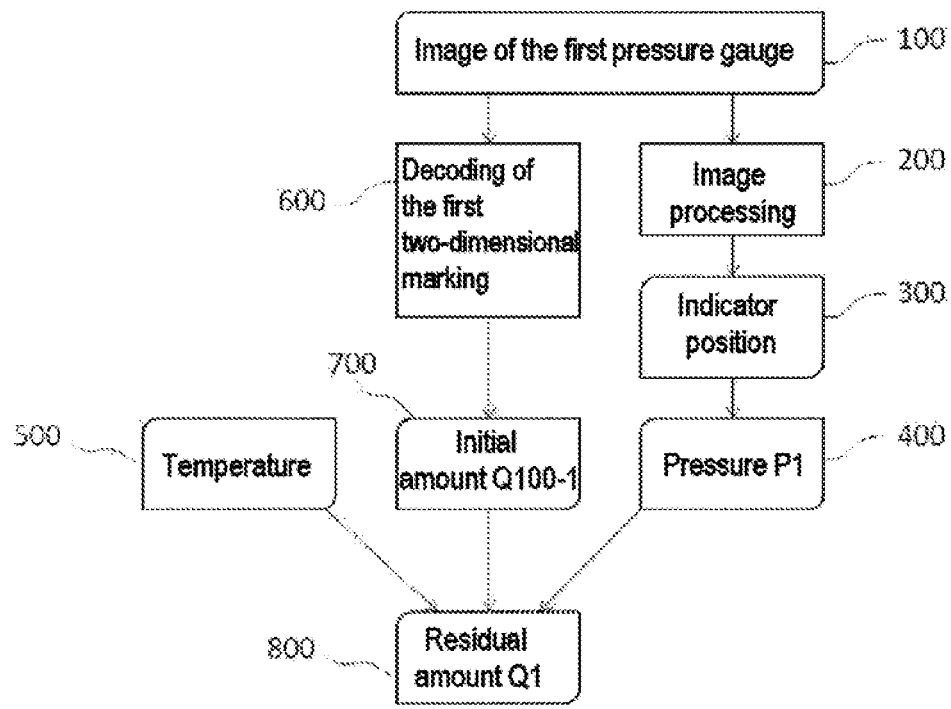
FIG. 7 shows a step of a method for determining the autonomy of an apparatus according to the invention.

The steps of the method according to the invention are shown in FIG. 7.

Firstly, an image is produced (step 100) of the first pressure gauge 2 of FIG. 3 or 4, in particular the first dial 3 of said pressure gauge 2, said image comprising at least the first two-dimensional marking 5 and the pressure indicator 4 positioned on or facing said first marking 5.

Optionally, the method according to the invention can comprise, prior to the production of said image, a step of the display 9 displaying a signal, message or any other suitable means inviting the user to position the image capturing device 7 in front of the pressure gauge 2.

Preferably, the produced image also includes at least one reference element 13. Indeed, the presence of the one or more reference elements 13 on the dial 3 allows the position and the orientation of the first two-dimensional marking 5 and/or of the needle 4 within said image to be precisely known.

The image of the first pressure gauge 2 is processed (step 200) to detect the angular position of the first pressure indicator 4 relative to the first two-dimensional marking 5 (step 300). Subsequently, the value of the pressure measured by the first pressure gauge 2 (step 400) is deduced from the angular position of the first pressure indicator 4.

Optionally, the method according to the invention can comprise a step of the user confirming the probable nature of the pressure deduced in step 400. Thus, if the deduced pressure does not seem to be correct, for example, abnormally low or high, this can be flagged by the user. A new image of the pressure gauge 2 can be produced.

According to the invention, the method further comprises a step 500 of measuring the temperature of the first container 1 by means of the temperature sensor 6. Preferably, the measured temperature value is read by the user, then entered and/or stored inside the electronic logic circuit 8. In the case of a liquid crystal temperature sensor 6, the user reads the temperature value then enters it manually, preferably via the display 9 also acting as a human/machine interface 10 of the touch type.

The image of the first pressure gauge 2 produced during step 100 is also processed (step 600) in order to decode (step 600) therefrom the data encoded in the two-dimensional marking 5, in particular said predetermined initial amount Q100-1 when it is encoded in the two-dimensional marking 5 (step 700). Optionally, other data as previously mentioned and which is contained in the marking 5, also can be decoded within the scope of the method according to the invention.

Finally, the data obtained in steps 400, 500, 700 is processed in order to determine the residual amount Q1 of acetylene in the first container 1, according to the explanations already provided to describe the apparatus according to the invention.

Figure 8:
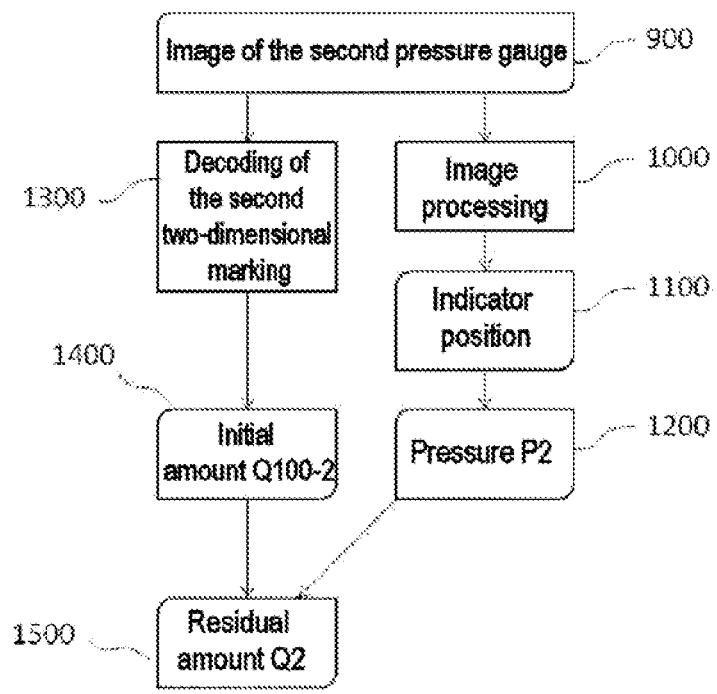
FIG. 8 shows a step of a method for determining the autonomy of an apparatus according to the invention.

The processing steps described above are applied in a similar manner to the second oxygen container 2, as shown in FIG. 8, apart from the container temperature measurement, which is not necessary for oxygen.

Said steps are typically implemented by the electronic logic circuit 8, preferably by means of a microprocessor and software.

Preferably, the method according to the invention comprises a step of storing at least one computation rule, as previously mentioned, inside the electronic logic circuit 8.

Preferably, the predetermined flow rate of oxygen-acetylene mixture is entered by the user as a function of the intended application, preferably via the display 9, which also acts as a human/machine interface 10 of the touch type.

Advantageously, the method according to the invention comprises a step of storing the following data inside the electronic logic circuit 8: a flow rate of oxygen-acetylene mixture distributed by the nozzle of a blowpipe (step 1600), a value of a first blowpipe acetylene supply pressure and a value of a second blowpipe oxygen supply pressure. The values of the first and second supply pressures can be stored by the user or even can be selected and stored automatically by the electronic logic circuit 8 as a function of the selected mixture flow rate, on the basis of a previously stored database (step 1700).

Figure 9:
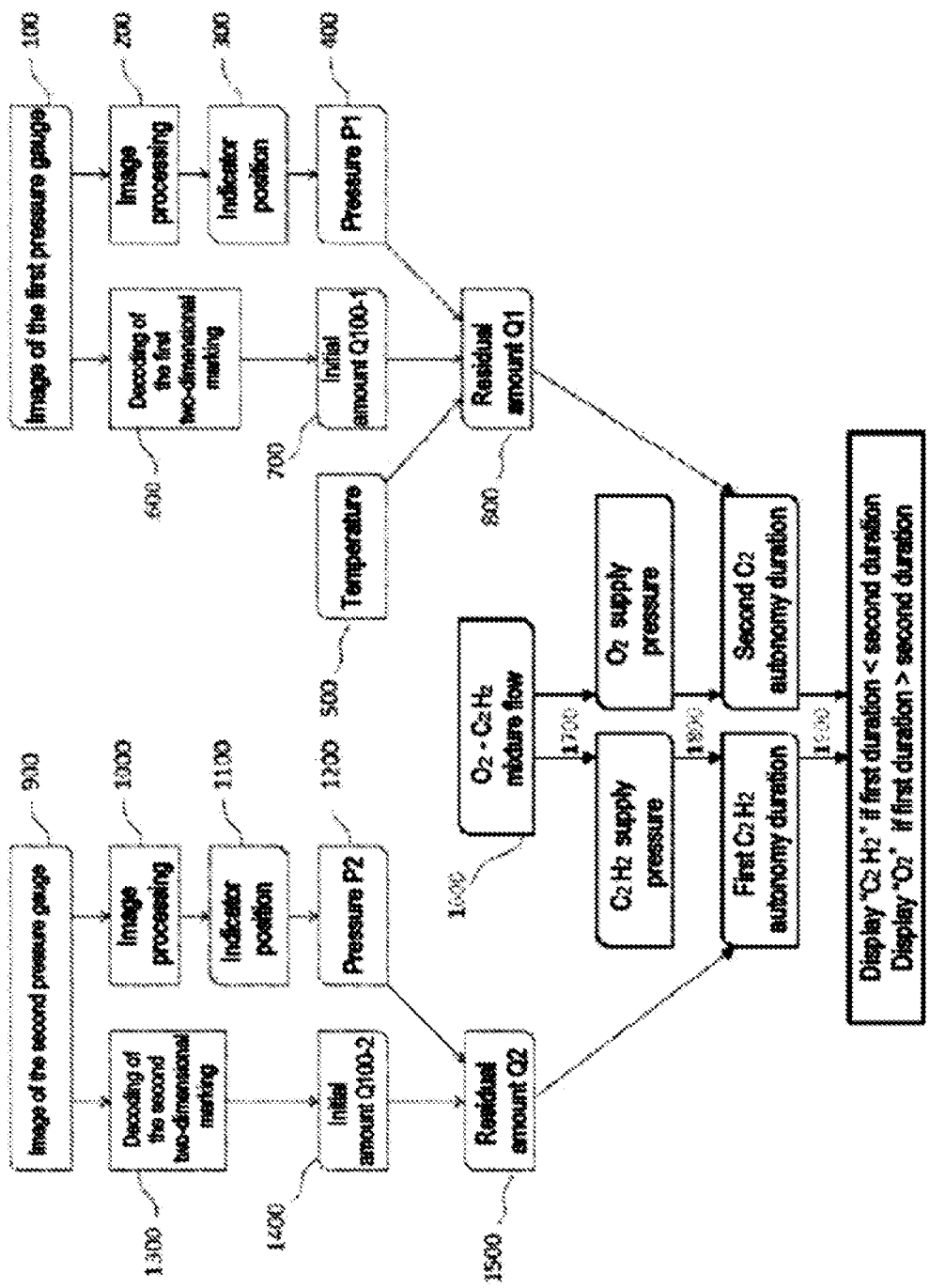
FIG. 9 shows a step of a method for determining the autonomy of an apparatus according to the invention.

According to the embodiment of the method shown in FIG. 9, the electronic logic circuit 8 is configured to determine (step 1800) a first acetylene autonomy duration, in accordance with the predetermined flow rates of oxygen-acetylene mixture, the first acetylene pressure and the residual amount of acetylene in the first container 1 and to determine a second oxygen autonomy duration, in accordance with the predetermined flow of oxygen-acetylene mixture, said second oxygen pressure and the residual amount of oxygen in the second container 21. The mode for computing these durations advantageously is that which is described in the above example.

Once the first acetylene autonomy duration and the second oxygen autonomy duration are determined, they are compared in order to determine the autonomy of the apparatus in terms of time, which corresponds to the shortest of said first and second durations.

The method then can comprise a step of displaying the gas limiting the apparatus, for example, an "$O_2$" or "$C_2H_2$" indication, i.e. the gas that will be depleted from the container first.

It is to be noted that the position of the needle 4, which can be superimposed on the information Q100-1 encoded in the first (or second) two-dimensional marking 5, does not disrupt the decoding of the information Q100-1 by virtue of the use of image recognition and data reconstruction techniques that are specific to the marking 5 encoding technology and are known to any person skilled in the art.

Furthermore, detecting the two-dimensional marking 5 also allows the position and the orientation of the two-dimensional marking 5 in the image of the pressure gauge 2 to be precisely known, and allows easy selection within the image of a zone of interest including the needle 4 and allows its position in the space to be reconstituted, i.e. its angular position on the dial 3.

For example, but not exclusively, the method according to the invention can implement image processing and decoding techniques, particularly one or more image recognition and shape recognition algorithms, as described in document WO-A-2015/136207.

As shown in FIG. 5, acquiring the raw image of the dial 4 of the pressure gauge 1 is preferably implemented using a digital reading device 11, in particular a device including a camera, such as a smartphone or a digital tablet, equipped with a camera and implementing a two-dimensional code reading application or module, particularly a QR code or bleam code, for example, a Manatee Works Barcode Scanner SDK code reading module running Android™, IOs or Windows Mobile.

For example, the steps of the aforementioned method were implemented on a smartphone running Android™ and using software based on an image processing library, such as OpenCV™.

The present invention is particularly useful for determining the autonomy of an oxyacetylene work apparatus in terms of time and/or in terms of amount of gas involving, for example, work of the cutting, welding, brazing, braze-welding, pre-welding pre-heating, heating for forming or heat treatment type.

By virtue of the invention, the oxyacetylene apparatus user is able to determine whether the amounts of acetylene and oxygen within the station are sufficient for their intended application or if they need to proceed with the replacement of one or more of the gas containers.

EXAMPLES

The effectiveness of the invention has been demonstrated by completing tests for determining residual amounts of acetylene and oxygen in an apparatus of the oxyacetylene type marketed under the reference OXYFLAM 1000.

The first container 1 was a cylinder marketed by AIR LIQUIDE under reference 505, with an initial amount of acetylene of 800 L, and the second container 21 was a cylinder marketed by AIR LIQUIDE under reference 505, with an initial amount of oxygen of 1,000 L. The containers 1, 21 were each provided with valves of the integrated pressure reducing valve type.

After reading and decoding the pressure gauges 2 and 22 respectively equipping the containers 1, 21, residual amounts of acetylene and of oxygen of 438 L (at 20° C.) and of 385 L, respectively, were determined, with the operation for determining the residual amount of acetylene implementing a temperature measurement of the container 1 according to the invention.

The intended method was autogenous welding of a 2 mm thick material, for which a 250 L/h flow is recommended, the blowpipe acetylene supply pressure being set to a value of 1 bar and the blowpipe oxygen supply pressure being set to a value of 2 bar.

Under these conditions, the oxygen was determined to be the limit gas of the apparatus, with a second oxygen autonomy duration equal to 2 hours and 19 minutes, therefore corresponding to the autonomy of the apparatus in terms of time.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. An oxyacetylene type work apparatus comprising:
a first container containing acetylene;
a first pressure gauge configured to measure the pressure in the first container, said first pressure gauge comprising a first dial and a first pressure indicator, said first pressure indicator being rotatable relative to said first dial;
a first two-dimensional marking disposed on the first dial, said first pressure indicator configured to adopt a plurality of angular positions relative to said first marking according to the value of the pressure in the first container;
a second container containing oxygen;
a second pressure gauge configured to measure the pressure in the second container, said second pressure gauge comprising a second dial and a second pressure indicator, said second pressure indicator being rotatable relative to said second dial;
a second two-dimensional marking disposed on the second dial, said second pressure indicator configured to adopt a plurality of angular positions relative to said second marking according to the value of the pressure in the second container;
an image capturing device configured to produce images of the first pressure gauge and of the second pressure gauge;
an electronic logic circuit configured to process said images of the first and second pressure gauges thereby determining the respective angular positions of the first and second pressure indicators relative to the first and second two-dimensional markings and to deduce from said angular positions the pressure values measured by the first and second pressure gauges, respectively,
a sensor configured to measure the temperature of the first acetylene container,
wherein the electronic logic circuit is configured to:
determine the residual amount of acetylene in the first container, in accordance with a predetermined initial amount of acetylene in the first container, the value of the temperature of the first container measured by the sensor and the value of the pressure measured by the first pressure gauge; and
determine the residual amount of oxygen in the second container, in accordance with a predetermined initial amount of oxygen in the second container and the value of the pressure measured by the second pressure gauge.

2. The apparatus as claimed in claim 1, wherein the temperature sensor is configured to measure the temperature through contact with the first container.

3. The apparatus as claimed in claim 1, wherein the temperature sensor is configured to remotely transmit temperature values of the first container.

4. The apparatus as claimed in claim 1, wherein the temperature sensor is affixed on the outer surface of the first container.

5. The apparatus as claimed in claim 1, wherein the temperature sensor is of the liquid crystal thermometer type.

6. The apparatus as claimed in claim 1, wherein the temperature sensor is of the infrared thermometer type.

7. The apparatus as claimed in claim 1, wherein said predetermined initial amount of acetylene is encoded in the first two-dimensional marking, the electronic logic circuit being configured to process the image of the first pressure gauge so as to decode said predetermined initial amount of acetylene.

8. The apparatus as claimed in claim 1, wherein said predetermined initial amount of oxygen is encoded in the second two-dimensional marking, the electronic logic circuit being configured to process the image of the second pressure gauge so as to decode said predetermined initial amount of oxygen.

9. The apparatus as claimed in claim 1, wherein said predetermined initial amount of acetylene and/or said predetermined initial amount of oxygen are stored in the electronic logic circuit.

10. The apparatus as claimed in claim 1, further comprising a blowpipe comprising a first supply line in fluid communication with the first container containing acetylene, a second supply line in fluid communication with the second container containing oxygen and a nozzle in fluid communication with said first and second passages, said nozzle being configured so as to distribute a predetermined flow of an oxygen-acetylene mixture when the blowpipe is supplied, via the first supply line, with a first determined acetylene pressure and when the blowpipe is supplied, via the second supply line, with a second determined oxygen pressure.

11. The apparatus as claimed in claim 1, wherein the electronic logic circuit is configured to determine a first duration of acetylene autonomy, in accordance with the predetermined flow of oxygen-acetylene mixture, said first acetylene pressure and the residual amount of acetylene in the first container, and to determine a second duration of oxygen autonomy, in accordance with the predetermined flow of oxygen-acetylene mixture, said second oxygen pressure and the residual amount of oxygen in the second container.

12. The apparatus as claimed in claim 1, wherein the temperature sensor is configured to measure the temperature of the outer surface of the first container.

13. The apparatus as claimed in claim 12, wherein the electronic logic circuit is configured to compare the first duration of acetylene autonomy and the second duration of oxygen autonomy and to determine the shortest of said first and second durations as being the autonomy of the apparatus in terms of time.

14. A method for determining the autonomy of an apparatus as claimed in claim 1, said method comprising the following steps:
a) producing an image of the first pressure gauge and processing said image so as to determine the angular position of the first pressure indicator relative to the first two-dimensional marking;
b) deducing from the angular position of the first pressure indicator the value of the pressure measured by the first pressure gauge;
c) producing an image of the second pressure gauge and processing said image so as to determine the angular position of the second pressure indicator relative to the second two-dimensional marking;
d) deducing from the angular position of the second pressure indicator the value of the pressure measured by the second pressure gauge;
e) measuring the temperature of the first container;

f) determining a predetermined initial amount of acetylene;

g) determining a predetermined initial amount of oxygen;

h) processing the data obtained in steps b), e) and f) so as to determine the residual amount of acetylene in the first container; and i) processing the data obtained in steps d) and g) so as to determine the residual amount of oxygen in the second container.

15. The method as claimed in claim 14, wherein, during step b), the image of the first pressure gauge is processed so as to decode a predetermined initial amount of acetylene encoded in the first two-dimensional marking and/or, during step g), the image of the second pressure gauge is processed so as to decode a predetermined initial amount of oxygen encoded in the second two-dimensional marking.

16. The method as claimed in claim 14, further comprising a step of storing the following data inside the electronic logic circuit:

a flow rate of the oxygen-acetylene mixture distributed by the nozzle of a blowpipe;

a value of the first blowpipe acetylene supply pressure; and a value of the second blowpipe oxygen supply pressure, the electronic logic circuit being configured to determine a first duration of acetylene autonomy, in accordance with the predetermined flow rates of the oxygen-acetylene mixture, the first acetylene pressure and the residual amount of acetylene in the first container, and to determine a second duration of oxygen autonomy, in accordance with the predetermined flow of oxygen-acetylene mixture, said second oxygen pressure and the residual amount of oxygen in the second container.

17. The method as claimed in claim 16, further comprising the following steps:

comparing the first acetylene autonomy duration and the second oxygen autonomy duration; and determining the shortest of said first and second durations as being the autonomy of the apparatus in terms of time.

18. The method as claimed in claim 17, wherein the limit gas is determined as being:

the acetylene if the first duration of acetylene autonomy is less than the second duration of oxygen autonomy; or the oxygen if the first duration of acetylene autonomy is greater than the second duration of oxygen autonomy.

* * * * *